No. 887,279. PATENTED MAY 12, 1908.
A. J. SMITH.
ODOMETER MOUNTING AND LOCK FOR VEHICLES.
APPLICATION FILED JUNE 10, 1907.
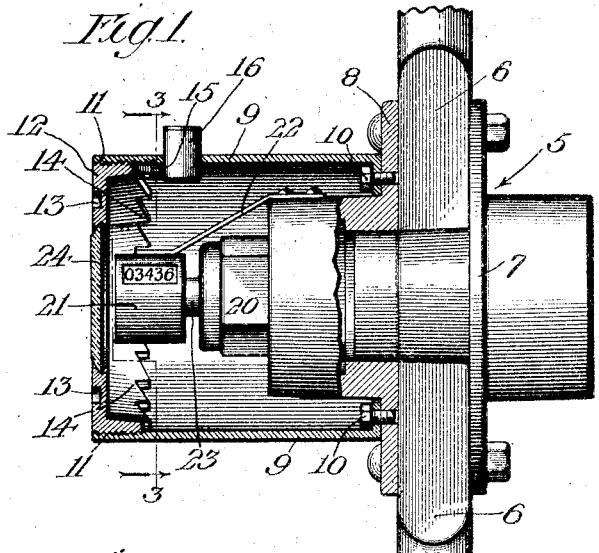
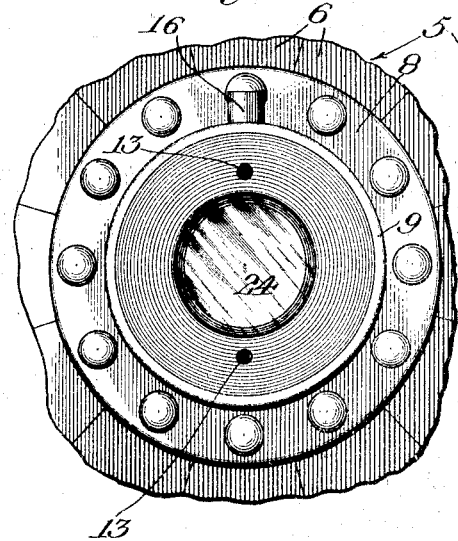 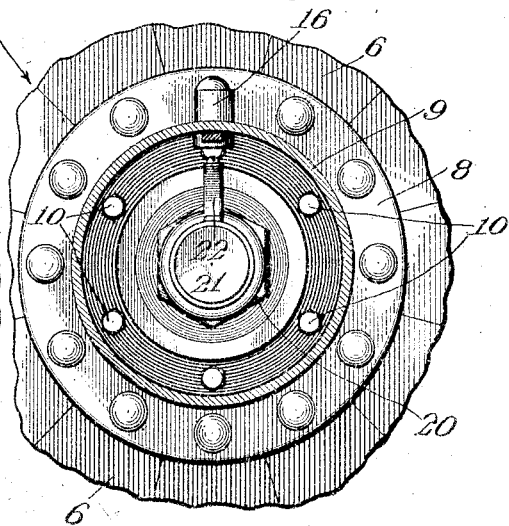
Witnesses:
Inventor:
Andrew J. Smith,
By Hazard & Strauss
Attorneys

UNITED STATES PATENT OFFICE.

ANDREW J. SMITH, OF LOS ANGELES, CALIFORNIA.

ODOMETER MOUNTING AND LOCK FOR VEHICLES.

No. 887,279.  Specification of Letters Patent.  Patented May 12, 1908.

Application filed June 10, 1907. Serial No. 378,111.

*To all whom it may concern:*

Be it known that I, ANDREW J. SMITH, a citizen of the United States, residing at Los Angeles, in the county of Los Angeles and State of California, have invented new and useful Improvements in Odometer Mountings and Locks for Vehicles, of which the following is a specification.

The object of my invention is to provide an odometer mounting and lock such that the reading of the odometer may be always observed, but will prevent the odometer being tampered with by any one but the owner of the vehicle. I accomplish this object by means of the device described herein and illustrated in the accompanying drawings, in which:—

Figure 1 is a sectional view showing a wheel hub equipped with my improved odometer mounting and lock. Fig. 2 is an end elevation of the same. Fig. 3 is a section taken on line 3—3 of Fig. 1.

Heretofore odometers have been mounted on vehicles in such a manner as to be easily tampered with by the driver using the vehicle so that the vehicle may have been driven many times as far as the odometer shows. The driver is thus enabled to collect from his passengers the full fare for the distance actually traveled and afterwards pays his employer for the distance recorded by the odometer, keeping the difference for himself. Drivers of private vehicles have also been enabled to use such vehicles for their own purposes by rendering the odometer inoperative for the time while they are using the vehicles.

My invention renders it impossible for any one but the vehicle owner to have access to the odometer and thus enables him to know how far his vehicle has traveled.

Referring to the drawings, 5 designates a wheel hub equipped with spokes 6 clamped between flanges 7 and 8. To outer flange 8 is secured a drum 9 by means of cap screws 10 which are accessible only from the inside of the drum. The outer end of drum 9 is interiorly threaded as at 11 and receives a cap 12 which is provided with holes 13 in its outer face to facilitate its being screwed into the end of drum 9. Cap 12 is provided on its inner face with ratchet teeth 14 which are adapted to engage with bolt 15 of lock 16 rigidly mounted in drum 9. Bolt 15 is preferably a spring bolt so that cap 12 may be turned in one direction and will be held from rotation in the opposite direction until bolt 15 is retracted by the operation of lock 16. By the above described means it is rendered impossible to remove drum 9 from the hub flange without unlocking cap 12.

Rigidly mounted on the end of axle nut 20 is an odometer 21 of usual construction. A flat spring 22 engages with the odometer casing and rotatively locks the odometer casing to the hub to which spring 22 is rigidly affixed. Shaft 23 of the odometer remains stationary as it is rigidly secured to nut 20 which is stationary. A glass front 24 is provided in cap 12 through which the reading of the odometer may be seen.

It will be noted from the above description that it is impossible to tamper with the odometer and falsify its reading without the use of a key to operate lock 16. It will be further noted that the odometer is always in a position where it may be read without the necessity of unlocking the case surrounding the same. Further the mounting of the odometer directly on the wheel hub dispenses with the usual necessary gearing and flexible shaft connections and thus renders the recording of the odometer more reliable and accurate.

Having described my invention what I claim as new and desire to secure by Letters Patent is:—

In a device of the class described, a revoluble vehicle wheel mounted on a stationary axle; an odometer having a stationary and a revoluble member, said stationary member being rigidly mounted on said axle and said revoluble member being rotatively secured to the hub of said wheel; a cylindrical casing for said odometer bolted to the hub of said wheel, the heads of the bolts projecting inside of said casing; and a screw cap for said casing adapted to be locked thereon.

In witness that I claim the foregoing I have hereunto subscribed my name this 1st day of June, 1907.

ANDREW J. SMITH.

Witnesses:
JIM. H. BARKELEW,
MYRTLE A. JONES.